No. 12,752. REISSUED FEB. 18, 1908.

J. L. TOMER.

MOWING MACHINE.

APPLICATION FILED OCT. 9, 1907.

Witnesses:

Chas. S. Lepley.

G. O. Hall.

Inventor:

John L. Tomer by C. M. Clarke his attorney

THE NORRIS PETERS CO., WASHINGTON, D. C.

UNITED STATES PATENT OFFICE.

JOHN L. TOMER, OF EXPORT, PENNSYLVANIA, ASSIGNOR OF ONE-HALF TO GEORGE D. HAMOR, OF NEW KENSINGTON, PENNSYLVANIA.

MOWING-MACHINE.

No. 12,752. Specification of Reissued Letters Patent. Reissued Feb. 18, 1908.

Original No. 834,646, dated October 30, 1906, Serial No. 317,277. Application for reissue filed October 9, 1907. Serial No. 396,694.

*To all whom it may concern:*

Be it known that I, JOHN L. TOMER, a citizen of the United States of America, residing at Export, in the county of Westmoreland and State of Pennsylvania, have invented certain new and useful Improvements in Mowing-Machines, of which the following is a specification, reference being had therein to the accompanying drawings.

This invention relates to certain new and useful improvements in mowing-machines; and the invention relates more particularly to the sickle or cutter-bar actuating mechanism of a mower.

The primary object of my invention is to provide a double pitman-actuating mechanism for imparting a reciprocating motion to the cutting knives or sickle of a mower. In using two pitmen I equally distribute the power necessary to reciprocate the sickle, strengthen the actuating mechanism, and free the same from danger of being broken or rendered inoperative by constant use.

With the above and other objects in view the invention further consists in the novel construction, combination and arrangement of parts to be hereinafter described and claimed.

Figure 1:
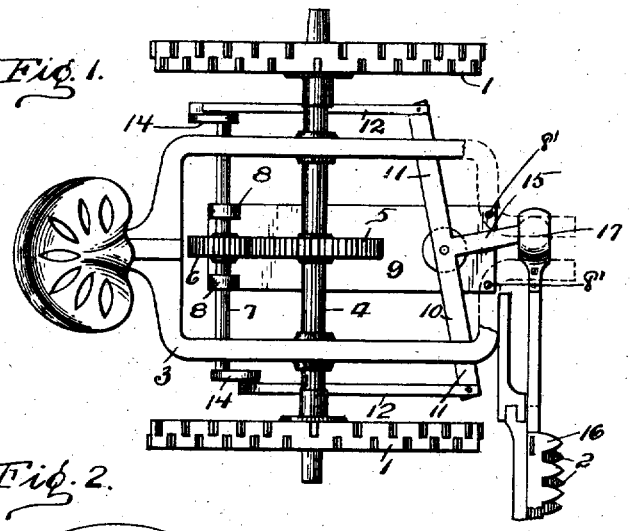
Figure 2:
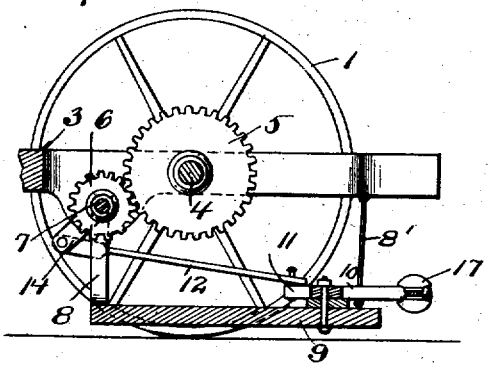
Figure 3:
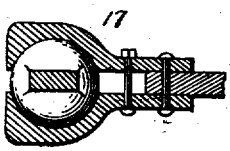
Figure 4:
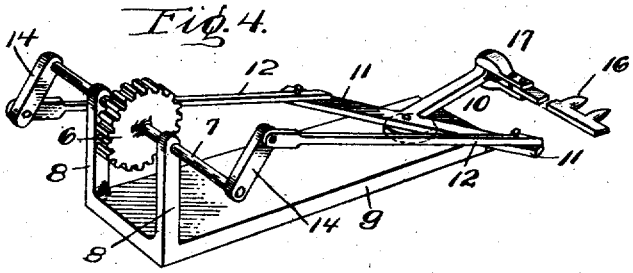

Referring to the drawings forming a part of this specification:—Figure 1 is a plan of a mower constructed in accordance with my invention. Fig. 2 is a longitudinal sectional view of the same. Fig. 3 is a detail sectional view of a ball-and-socket connection. Fig. 4 is a perspective view of my improved actuating mechanism detached from a mower.

In the accompanying drawings, 4 indicates the axle, on which the traction-wheels 1 are secured, said axle being journaled in the main frame 3, motion being communicated from the axle through mechanism to be hereinafter described to the sickle 16 of the finger-bar 2. On the axle 4 is mounted a drive-pinion 5, which meshes with a smaller pinion 6, carried on a transverse shaft 7, said transverse shaft 7 being journaled in the main frame 3. Suspended from said transverse shaft 7 by hangers 8 and from the frame 3 by the hangers 8′ or otherwise is a platform 9, or other suitable supporting framework. The hangers 8 are attached to the platform at the rear corners thereof, while the hangers 8′ are connected to said platform at the front corners thereof, or in any other suitable manner. Pivotally mounted on this frame near its forward end is a pitman-lever 10, of substantially T shape the two arms 11 11 of which are loosely connected by pitmen 12 12 to cranks 14, carried on shaft 7. The forwardly-extending arm 15 of the pitman-lever 10 is connected to the sickle 16 of the cutter-bar mechanism 2 by a ball-and-socket joint 17.

In operation the pitmen 12 12, driven through the medium of pinions 5 and 6 and shaft 7 and its cranks 14, impart an oscillatory motion to the pitman-lever 10, which in turn reciprocates the sickle 16.

What I claim, and desire to secure by Letters Patent, is—

1. In a mowing-machine, the combination of a main frame provided with an axle and supporting traction wheels, an underframe, a crank shaft and gearing connecting it with the axle, a sickle bar, a pivoted triple-arm lever mounted on the underframe and connected with the sickle bar, and pitmen actuated by the crank shaft and connected with the triple-arm lever, substantially as set forth.

2. In a mowing-machine, the combination of a main frame provided with an axle and supporting traction wheels, an underframe, a crank shaft and gearing connecting it with the axle, a sickle bar, a pivoted triple-arm lever mounted on the underframe and having a ball-and-socket connection with the sickle bar, and pitmen actuated by the crank shaft and connected with the triple-arm lever, substantially as set forth.

3. In a mowing machine, the combination of a main frame provided with an axle and supporting traction wheels, an underframe, a reciprocating sickle, a triple-arm lever mounted on the under-frame having one arm connected with the sickle and oppositely extending arms at substantially right angles to said arm, a shaft geared with the axle and provided with cranks, and pitmen connecting each of said cranks with each of said oppositely extending arms and arranged to alternately actuate said arms in opposite directions, substantially as set forth.

4. In a mowing machine, the combination of a main frame provided with an axle and supporting traction wheels, an under-frame, a reciprocating sickle, a triple-arm lever mounted on the under-frame having one arm connected with the sickle and oppositely extending arms at substantially right angles to said arm, a shaft geared with the axle and provided with cranks, and pitmen connecting each of said cranks with each of said oppositely extending arms and arranged to positively actuate each of said arms alternately forwardly and backwardly to reciprocate the sickle, substantially as set forth.

5. The combination with the axle, the drive-wheels mounted thereon, and the main frame in which the axle is journaled, of a pinion mounted on the axle, a transverse shaft journaled in the frame on a plane below the axle and having a crank on each end, a pinion on said transverse shaft meshing with the pinion on the axle, hangers mounted on said transverse shaft, hangers secured to the frame near its forward end, a platform suspended from said hangers, a pitman-lever pivotally mounted on said platform near its forward end, pitmen connecting said pitman-lever with the cranks of the transverse shaft, and a ball-and-socket joint connecting said pitman-lever with a sickle, substantially as described.

6. Sickle-actuating mechanism for mowing-machines, comprising in combination with a drive-axle, drive-wheels secured thereon, a main frame in which the axle is journaled, and a sickle, of a pinion mounted on the axle, a crank shaft journaled in the main frame, a pinion carried by said shaft and meshing with the pinion on the axle, a platform, hangers connected to the platform and to said shaft for supporting the platform at its rear end, hangers connected to said platform, and to the frame for supporting the platform at its forward end, a pitman-lever connected to the sickle and pivotally mounted on the platform, and pitmen connecting said pitman-lever with the crank shaft, substantially as described.

In testimony whereof I hereunto affix my signature in the presence of two witnesses, this 12th day of September, A. D. 1907.

JOHN L. TOMER.

Witnesses:

DANIEL BURNS,

J. L. SPIEGEL.